Figure 1:
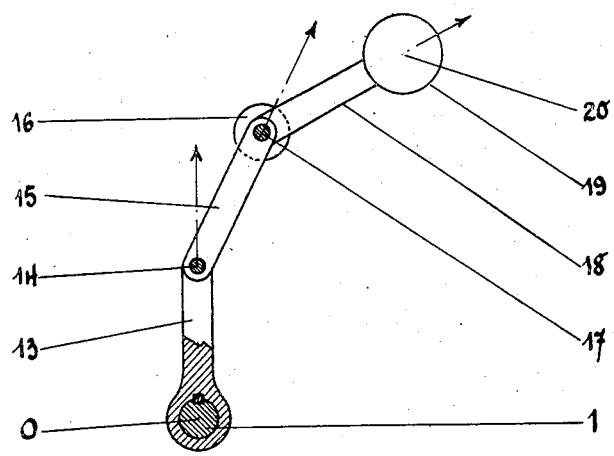

Patented Nov. 28, 1939

2,181,610

UNITED STATES PATENT OFFICE 2,181,610

OSCILLATION DAMPING MEANS

François Marie Michel Bernard Salomon, Paris, France

Original application March 31, 1933, Serial No. 663,866. Divided and this application June 22, 1937, Serial No. 149,775. In France April 7, 1932

6 Claims. (Cl. 74—574)

This invention relates to machine elements and mechanisms and more particularly to apparatus for damping or eliminating vibrations or oscillations in objects subjected to disturbing forces.

This application is a division of my prior copending application Serial No. 663,866 filed March 31, 1933 which issued as Patent No. 2,103,643 on December 28, 1937.

One of the objects of the present invention is to provide novel means for eliminating oscillations in objects, such as machine shafts or other machine parts which are subjected to disturbing forces, by the use of complex pendular systems comprising movable masses subjected on the one hand to said disturbing forces and on the other to forces of inertia created by the rotation of a shaft with which the masses are associated. The latter shaft may or may not be the machine shaft or part from which the disturbing oscillations or vibrations are desired to be eliminated.

This complex system of movable masses may be used, in certain cases, to dampen or eliminate the effects of a single disturbing force or action and in others to dampen or eliminate a plurality of simultaneous disturbances. In the first case, suitable geometrical and dynamic conditions are provided so that in practice the system formed by the various movable masses oscillates at a single frequency of oscillation having a natural period equal or substantially equal to the period of disturbance to be eliminated. In the other cases, two or more natural periods of the system may be chosen equal to two or more different periods of the disturbances to be eliminated simultaneously.

My invention may be used for the most varied purposes. It enables one to replace the usual fly wheels employed for regularizing the movement of machine shafts for stationary machines, rail and road vehicles of all kinds, ships, airships, etc., by much lighter fly wheels while retaining or even increasing the cyclic regularity of operation.

My invention is applicable to all branches of industry, piston motors of all types, piston pumps of all types, and even turbines, electrical machines, motion picture machine mechanisms, presses, rolling mills and the like. It is not limited to the cyclic regularization of a rotary shaft but is adapted also to dampen or eliminate vibrations of all kinds, such as torsional or sagging (bending) vibrations, from machine shafts or other parts subjected to disturbing vibratory or oscillatory forces.

In devices embodying the invention the masses may be arranged at different points along the shaft, such as at the front or rear of a motor or pump crankshaft, for example, or the same may be distributed at various other points along the shaft. It should also be well understood that the disturbing torques to be eliminated or damped may be of any origin and may be produced by the driving torque, the resisting torque or any other cause.

Figure 2:
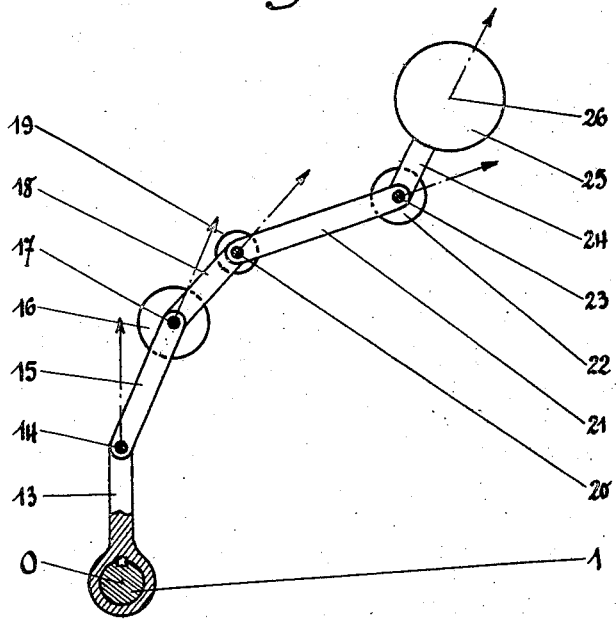

In the drawing, which is for the purpose of illustration only and is not intended to define the limits of the invention and wherein like reference characters refer to like parts throughout the several views, Fig. 1 is a diagrammatical view, partly in section and with parts broken away, illustrating one form of device embodying the present invention; and, Fig. 2 is a similar view of a modified structure embodying the invention.

In the embodiment illustrated in Fig. 1, by way of example, a crank 13 is rigidly secured to a rotatable shaft 1 in which vibrations or oscillations are to be damped, or, as pointed out above, is associated with a structure in which such disturbances are to be damped. Pivoted at 14 on crank 13 is a rod 15 which engages a mass 16. A rod 18 is pivotally connected at 17 to rod 15 so that it may pivot about the center of mass 16. Rod 18 carries another mass 19 at the outer end thereof having its center of gravity at 20.

In response to centrifugal forces during the rotation of shaft 1, the linked system 15, 18 tends to extend in radial alignment with crank 13. Disturbances in the driving or resisting torques may cause fluctuations in the angular speed of shaft 1 and possibly cross-wise oscillations thereof. As a result of these fluctuations or oscillations, masses 16 and 19 are caused to oscillate about their positions of equilibrium with the same periodicity as said disturbances.

The movements of masses 16 and 19 tend to oppose the causes producing said movements, particularly when certain dynamic conditions are accurately fulfilled or satisfied. Assuming friction to be negligible, these conditions correspond substantially to conditions of resonance with respect to the frequency of the disturbing forces. More generally the complex pendular system may, for example, have two natural periods of oscillation which correspond as nearly as possible to the periods T and T' of two of the periodical disturbances to be eliminated.

In addition to or in lieu of the pendular system illustrated in Fig. 1, a treble, quadruple or other multiple pendular system of masses may be employed for damping vibrations in shaft 1. For example, as illustrated in Fig. 2, the second mass 19 may carry a third mass 22 linked thereto by a rod 21 which is pivotally connected to rod 18 at 20. A fourth mass 25 having its center of gravity at 26 may be carried by rod 24 which is pivotally connected to rod 21 at the center of gravity 23 of mass 22.

The conditions of resonance, referred to above, imply negligible friction and in practice it is very important to obtain as little friction as possible. There are cases, however, in which friction tending to retard the movements of the masses must be taken into account even though this friction be very slight.

It will be understood that the present invention is also applicable to the case of movable masses adapted to oscillate in a plane oblique to the axis of shaft 1.

Attention is invited to and particular stress is laid on the great similarity that exists between the movable mass system of this invention and a system formed by inductance coils, condensers, and optionally, mutual inductance coils, as used for electro-technical purposes under the name of "electric filters". This similarity is not merely an apparent one, but corresponds to a parallelism between the two analytical theories. It is for this reason that I refer to the movable masses employed in carrying out the invention as "filtering masses".

The systems above described may be arranged at any points along a shaft from which irregularities of angular speed or vibrations are to be eliminated. For example, in an automobile motor, a fly wheel provided with the invention and which may be referred to as a filtering flywheel may be placed adjacent the front of the motor, at the rear of the motor adjacent the clutch, or in the middle of the crank shaft of the motor. However, for a more efficient elimination or damping of oscillations of the crank shaft, it is often advantageous to mount devices embodying the invention near the points where the disturbing forces arise, such as near the head of each connecting rod.

Although only a limited number of embodiments of the invention have been illustrated and referred to in the foregoing description, it is to be expressly understood that the same is not limited thereto. For example, various changes in the design and arrangement of parts illustrated, which will now be apparent to those skilled in the art, may be made without departing from the spirit and scope of the invention. It will also be understood that the more complete disclosure of the principles of the invention and the uses thereof contained in my parent patent, above referred to, is to be considered a part of the disclosure of this application. For a definition of the limits of the invention reference is had primarily to the appended claims.

What I claim is:

1. Means for damping oscillations in a rotatable member comprising means rigidly secured to said member and rotatable therewith, a damping mass, a pivotal connection between said mass and means, the center of gravity of said mass being at a predetermined fixed distance from the axis of said pivotal connection, a second damping mass, and a pivotal connection between the latter and said first-named mass.

2. Means for damping oscillations in a rotatable member comprising means rigidly secured to said member and rotatable therewith, a damping mass, a pivotal connection between said mass and means, the center of gravity of said mass being at a predetermined fixed distance from the axis of said pivotal connection, a second damping mass, and a pivotal connection between the latter and said first-named mass, said second mass having the center of gravity thereof displaced a predetermined fixed distance from said last-named pivotal connection.

3. A device for damping oscillations in a rotatable member comprising means rigidly secured to said member and rotatable therewith, a damping mass, a pivotal connection between said mass and said means, the center of gravity of said mass being at a predetermined distance from the axis of said pivotal connection, and a number of other damping masses, each of which is pivotally connected to the adjacent one.

4. A device for damping oscillations in a rotatable member comprising means rigidly secured to said member and rotatable therewith, a first damping mass, means for operatively connecting said mass to said means for angular movement about an axis displaced from the axis of rotation of said member, and a number of other damping masses each of which is operatively connected to the adjacent one for rocking movement relative thereto, at least one of the mass-connecting means being a pivotal one.

5. Apparatus for damping oscillations in a structure comprising rotatable means, a damping mass, a pivotal connection between said mass and means at a point radially displaced from the center of rotation of said means, the center of gravity of said mass being at a predetermined, fixed distance from the axis of said pivotal connection, a second damping mass, and a pivotal connection between the latter and said first-named mass.

6. A device for damping oscillations in a structure comprising rotatable means, a damping mass, means for operatively connecting said mass to said rotatable means for angular movement about an axis radially displaced from the axis of rotation of said rotatable means, and a number of other damping masses each of which is pivotally connected to the adjacent one.

FRANÇOIS MARIE MICHEL
BERNARD SALOMON.